United States Patent
Kunz (10) Patent No.: US 11,614,925 B1
(45) Date of Patent: Mar. 28, 2023

(54) DATA MODEL INFRASTRUCTURE AS A SERVICE

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 17/486,563

(22) Filed: Sep. 27, 2021

(51) Int. Cl.
    *G06F 8/35* (2018.01)
    *G06F 8/30* (2018.01)
    *G06F 8/20* (2018.01)

(52) U.S. Cl.
    CPC .................. *G06F 8/35* (2013.01); *G06F 8/20* (2013.01); *G06F 8/311* (2013.01)

(58) Field of Classification Search
    None
    See application file for complete search history.

(56) References Cited

U.S. PATENT DOCUMENTS

| | | | | |
|---|---|---|---|---|
| 7,454,428 | B2 * | 11/2008 | Wang | G06F 16/284 |
| 7,861,251 | B2 * | 12/2010 | Harvey | G06F 16/951 719/330 |
| 9,996,976 | B2 * | 6/2018 | Zhou | G06T 7/344 |
| 10,015,268 | B2 * | 7/2018 | Rao | H04L 45/64 |
| 10,318,253 | B2 * | 6/2019 | Jann | G06F 8/35 |
| 10,541,938 | B1 * | 1/2020 | Timmerman | H04L 43/065 |
| 10,601,942 | B2 * | 3/2020 | Walsh | G06F 16/9574 |
| 10,606,576 | B1 * | 3/2020 | Tung | G06F 16/172 |
| 10,623,390 | B1 * | 4/2020 | Rosenhouse | H04L 67/10 |
| 10,809,991 | B2 * | 10/2020 | Tung | G06F 21/53 |
| 10,846,071 | B2 * | 11/2020 | Tung | G06F 16/172 |
| 10,908,971 | B1 * | 2/2021 | Gonzalez | G06F 8/41 |
| 10,936,292 | B2 * | 3/2021 | Tung | G06F 9/5072 |
| 10,979,440 | B1 * | 4/2021 | Kalika | H04L 9/3247 |

(Continued)

FOREIGN PATENT DOCUMENTS

| | | | | |
|---|---|---|---|---|
| CA | 3056281 | A1 * | 3/2020 | G06F 16/211 |
| CA | 3056284 | A1 * | 3/2020 | G06F 16/212 |
| WO | WO-2022036052 | A1 * | 2/2022 | G06Q 20/1085 |

OTHER PUBLICATIONS

Zheng, Zibin, Jieming Zhu, and Michael R. Lyu. "Service-generated big data and big data-as-a-service: an overview." 2013 IEEE international congress on Big Data. IEEE, 2013. (Year: 2013).*

(Continued)

*Primary Examiner* — Matthew J Brophy
(74) *Attorney, Agent, or Firm* — Schwegman Lundberg & Woessner, P.A.

(57) ABSTRACT

In an example embodiment, a data model infrastructure is implemented as a service rather than as an always-running server. Specifically, one of the technical issues with past implementations is that the data models are deployed onto a server that is intended to be "always running", even if there are no requests to the server. This utilizes memory and processing power. While it may be useful to have an always running server for commonly used applications, for applications that are infrequently used (e.g., 10 times a month), it can mean that memory and processing power is wasted. Thus, by implementing the data model infrastructure as a service rather than an always-running server, the service can be launched only when actually needed, saving both memory and processing power.

20 Claims, 7 Drawing Sheets

(56) References Cited

U.S. PATENT DOCUMENTS

| | | | | |
|---|---|---|---|---|
| 11,169,789 B2* | 11/2021 | Tung | ................... | H04L 63/104 |
| 11,379,205 B2* | 7/2022 | Tung | ................... | H04L 63/10 |
| 2001/0027470 A1* | 10/2001 | Ulmer | ................... | G06Q 30/02 |
| | | | | 709/203 |
| 2016/0337474 A1* | 11/2016 | Rao | ................... | H04L 41/12 |
| 2017/0039765 A1* | 2/2017 | Zhou | ................... | G06T 7/521 |
| 2020/0133650 A1* | 4/2020 | Tung | ................... | G06F 16/901 |
| 2020/0133742 A1* | 4/2020 | Tung | ................... | G06F 21/31 |
| 2020/0133922 A1* | 4/2020 | Tung | ................... | G06F 21/31 |
| 2020/0134002 A1* | 4/2020 | Tung | ................... | H04L 67/34 |
| 2020/0225983 A1* | 7/2020 | Jung | ................... | G06F 9/5027 |
| 2020/0409676 A1* | 12/2020 | Tung | ................... | G06F 16/172 |
| 2021/0026613 A1* | 1/2021 | Tung | ................... | G06F 16/1774 |
| 2021/0064355 A1* | 3/2021 | Martinsson | ............... | G06F 8/30 |
| 2021/0132935 A1* | 5/2021 | Dinh | ................... | G06F 9/4411 |
| 2021/0149656 A1* | 5/2021 | Tung | ................... | G06F 8/60 |
| 2021/0152554 A1* | 5/2021 | Taft | ................... | G06F 9/45558 |
| 2021/0314365 A1* | 10/2021 | Smith | ................. | G06F 11/3006 |
| 2022/0391268 A1* | 12/2022 | Young | ................... | G06F 9/541 |

OTHER PUBLICATIONS

Xinhua, E., et al. "Big Data-as-a-Service: Definition and architecture." 2013 15th IEEE international conference on communication technology. IEEE, 2013. (Year: 2013).*

Parra Royón, Manuel Jesús, and José Manuel Benitez Sánchez. "Fuzzy systems-as-a-service in cloud computing." (2019). (Year: 2019).*

* cited by examiner

DATA MODEL INFRASTRUCTURE AS A SERVICE

BACKGROUND

Data model infrastructures allow for code used to create software applications to be easily reused. One example of such a data model infrastructure is Core Data Services (CDS) from SAP SE of Walldorf, Germany. CDS enables service definitions and data models to be declaratively captured in plain object notations. CDS models are typically written in CDS language, and when compiled are typically stored in Javascript Object Notation (JSON) files, which comply with a standard notation, such as core schema notation (CSN). These models are compiled and run on a server, which can then handle requests for the application defined by the model(s) as they come in.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a data model infrastructure is implemented as a service rather than as an always-running server. Specifically, one of the technical issues with past implementations is that the data models are deployed onto a server that is intended to be "always running", even if there are no requests to the server. This utilizes memory and processing power. While it may be useful to have an always running server for commonly used applications, for applications that are infrequently used (e.g., 10 times a month), it can mean that memory and processing power is wasted. Thus, by implementing the data model infrastructure as a service rather than an always-running server, the service can be launched only when actually needed, saving both memory and processing power.

There are several technical issues, however, with implementing a data model infrastructure as a service. The first is that, since the application corresponding to the data model infrastructure model is launched when needed in a service-implementation (e.g., when a request for the application is received), it needs to be launched quickly otherwise a client application making the request may time out or the delay in responding to the request may be too long for the client application. The second is that even once the application corresponding to the data model infrastructure model is launched, the application needs to be able to run quickly, which means that it should have low overhead. The so-called bootstrap time needed to launch the application therefore should be kept to a minimum, to ensure timely launch when the application is requested.

In an example embodiment, the data model infrastructure model is compiled prior to launch. This eliminates the time taken to compile the model from the launch process, and therefore significantly increases the launch speed. Additionally, in an example embodiment, a system programming language is utilized to implement the data model infrastructure as a service. A system programming language is a programming language used for system programming. Examples include Rust, Go, and C++. This is in contrast to a general-purpose programming language, such as JavaScript, which may be implemented using node.js. General purpose programming languages tend to focus on generic features to allow programs written in the language to use the same code on different platforms. The generic quality typically comes at the cost of denying direct access to the machine's internal workings. System programming languages, on the other hand, are not designed for compatibility, but for performance and ease of access to the underlying hardware, while still providing high-level programming concepts like structured programming. The result is that the corresponding application runs faster when implemented in a system programming language as a service than it would if it were implemented in a general purpose programming language as a service.

In an example embodiment, Rust is used the programming language to implement the data model infrastructure as a service. Rust has several advantages over Go or C++ for this purpose. Specifically, while C++ can operate quickly in a service embodiment, it lacks the memory safety of Rust and Go. It is possible to encounter a buffer overflow and there is a higher likelihood of security issues with Go. Furthermore, unlike Go, Rust does not utilize a garbage collector. This saves additional memory and increases speed at runtime in a Rust implementation over a Go implementation. Nevertheless, while Rust has these advantages, embodiments are foreseen using Go or C++, as well as other types of system programming languages, and nothing in this document shall be read as limiting the scope of this document to only Rust implementations, unless explicitly stated.

Figure 1:
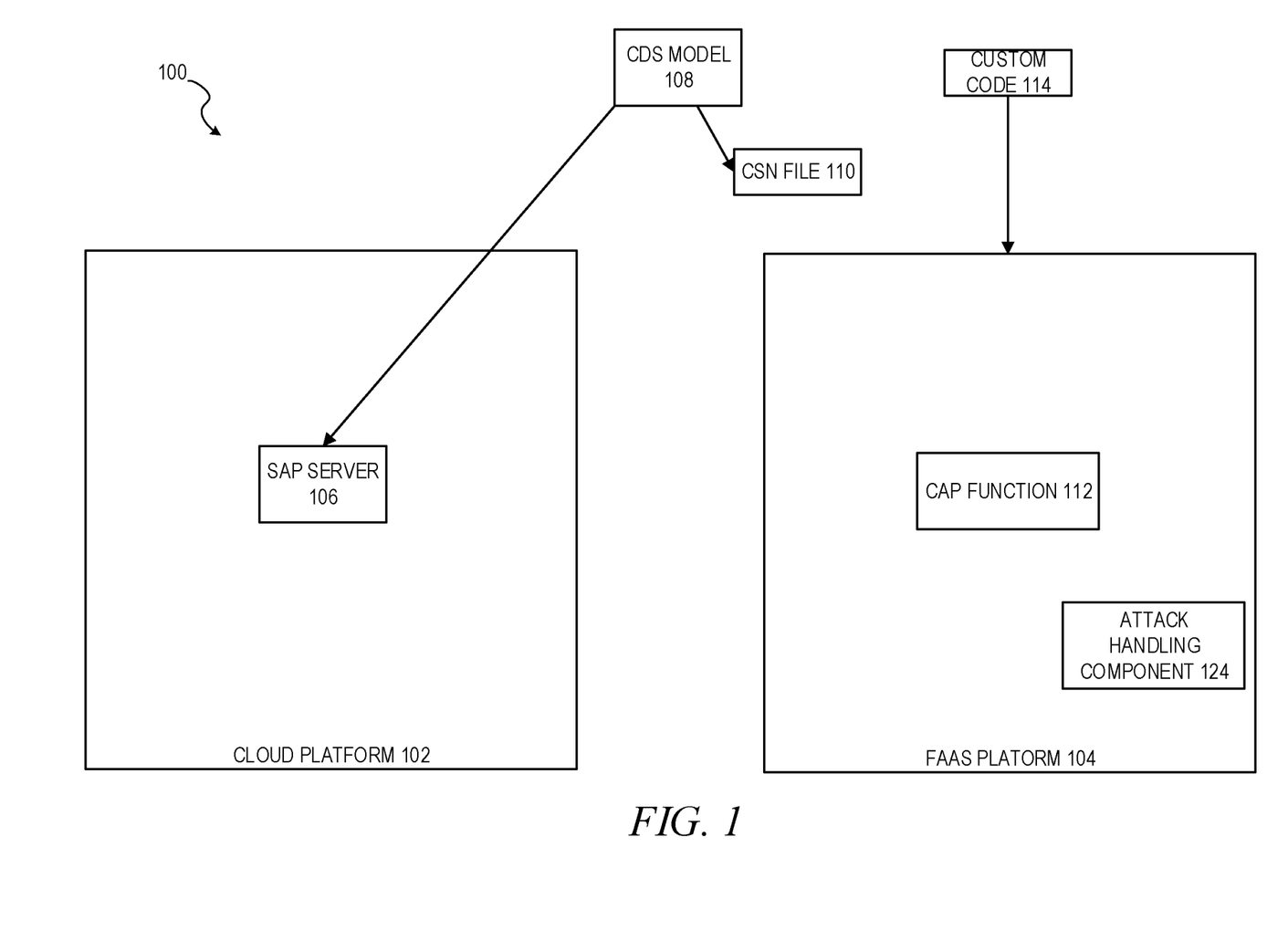
FIG. 1 is a block diagram illustrating a system in accordance with an example embodiment. Here, system includes both a cloud platform and a function-as-a-service (FaaS) platform.
Figure 2:
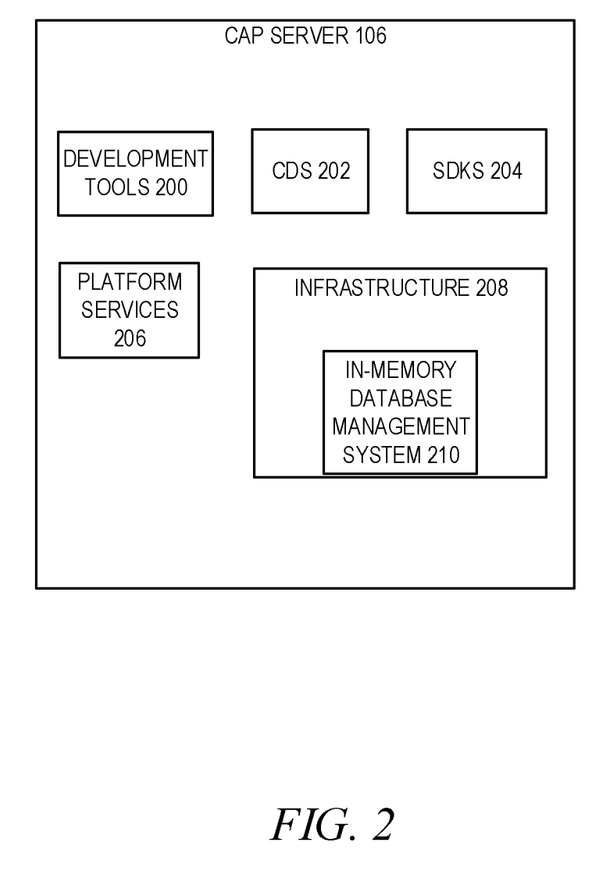
FIG. 2 is a block diagram illustrating a CAP server in more detail, in accordance with an example embodiment.

FIG. 1 is a block diagram illustrating a system 100 in accordance with an example embodiment. Here, system includes both a cloud platform 102 and a function-as-a-service (FaaS) platform 104. Cloud platform 102 operates a cloud application programming (CAP) server 106. CAP is a framework of languages, libraries, and tools for building enterprise-grade services and Applications. FIG. 2 is a block diagram illustrating a CAP server 106 in more detail, in accordance with an example embodiment. As can be seen, CAP server 106 includes development tools 200, core data services (CDS) 202, Service software development toolkits (SDKs) 204, platform services 206, and infrastructure 208. Development tools 200 include a number of software tools that developers can use to design applications using CDS 202. CDS 202 is a universal modeling language for both domain models and service definitions. Domain models in CDS 202 capture static aspects of problem domains as entity-relationship models. Associations capture relationships. Compositions extend that to model document structures. Annotations allow for the enrichment of models with additional metadata, such as for user interfaces, validations, and authorizations. CDS comprises a common set of domain-specific languages (DSL) and services. The CDS component 130 may allow defining and consuming semantically rich data models as an integral part of the database structure, thereby permitting data modeling as well as the retrieval and processing of data to be raised to a higher semantic level that is closer to the conceptual thinking of domain experts.

Service SDKs 204 are sets of software tools and programs, including libraries and APIs, to implement and consume services written in Node.js and/or Java format. Platform services 206 enable, facilitate, or accelerate the development of applications. Infrastructure 208 performs tasks as memory management and control.

In an example embodiment, infrastructure 208 may include an in-memory database management system 210, such as HANA® from SAP SE of Walldorf, Germany. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. A client application may include presentation logic to provide an output comprising data of the underlying database structure in a form desired by a user. The presentation logic may communicate such output in the form of hypertext markup language (HTML), cascading style sheets (CSS), and/or JavaScript, or a variety of other user interface technologies, which can be used by applications such as web browsers (or other applications compatible with web-based browser technology) to display information in a graphical user interface to users of an application.

Figure 3:
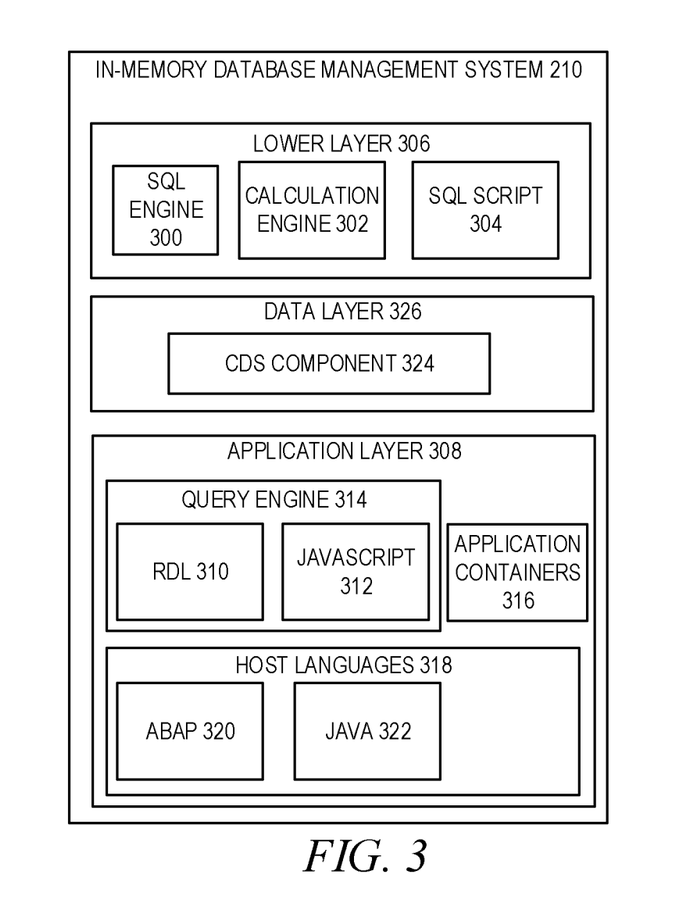
FIG. 3 is a block diagram illustrating an in-memory database management system in more detail, in accordance with an example embodiment.

FIG. 3 is a block diagram illustrating an in-memory database management system 210 in more detail, in accordance with an example embodiment. Here, the in-memory database management system 210 includes a Structured Query Language (SQL) engine 300, calculation engine 302, and SQL script 304, as part of a lower layer 306 that performs basic data definition and processing based upon a relational model, according to which the data is organized. FIG. 3 also depicts an application layer 308, including Report Definition Language (RDL) 310 and JavaScript 312 of a query engine 314. The application layer 308 also comprises application containers 316 and other host languages 318, including ABAP 320 and CDS component 322.

FIG. 3 further depicts a CDS component 324 situated between the lower layer 306 and the application layer 308. The CDS component 324 can be leveraged in any consuming stack variant (stack of software layers located on top of each other), as implemented through the application layer 308. Specifically, services in higher layers can use/consume the services of lower layer. Here, because the application layer 308 sits on top of a Data Definition Language 326 in which the CDS component 324 resides, definition and consumption of the semantically rich higher-level models is permitted.

In particular, the CDS component 322 implements higher-level Domain Specific Languages (DSLs) and services based on an entity-relationship model (ERM). The Data Definition Language (DDL) 326 is used for defining semantically rich data models, including the data types, associated metadata, and database organization (e.g., columns and tables). The DDL 326 may be extended to further enrich these data models through the use of entities and annotations.

The Query Language (QL) 328 is used to conveniently and efficiently read data based on data models. It is also used to define views within data models.

The Expression Language (EL) 330 is used to specify calculated fields, default values, constraints, etc., within queries. Calculated fields, default values, and constraints may be specified as well as for elements in data models. Other elements of the CDS component 322 can include Data Manipulation Language (DML) 332 and a Data Control Language (DCL) 334, both of which may be used to control access to data.

CAP allows developers to declaratively model their desired entities and their relationships. Using this approach, many generic features such as create, read, update, and delete requests can be universally implemented without the application developer needing to write code, or even know how to write code. CAP may be implemented in Node.js or Java.

Returning to FIG. 1, in an example embodiment, the CAP server 106 may be utilized for applications that can be benefit from an always running application server, such as applications that are used and/or accessed frequently. A CDS model 108 may be used when launching a corresponding CAP server 106 in the cloud platform 102, compiling the CDS model 108 into CSN format when launching the corresponding CAP server 106.

For applications that are turn more frequently, FaaS platform 104 is used instead of the cloud platform 102. Notably, however, rather than compiling the CDS model 108 at launch time, here the compiling occurs prior to launch time. Indeed, here the CDS model 108 is compiled into CSN file 110 outside the FaaS platform 104. The CSN file 110 is then fed to the FaaS platform 104, which launches CAP function 112 within the FaaS platform 104 only when a request for the corresponding application is received. The FaaS platform 104 closes the CAP function 112 after a predetermined uptime period. This allows the CAP function 112 to perform the same functions as the CAP server, but without the memory overhead of maintaining "always on" functionality. Further, in an example embodiment, the code being the CAP function 112 may be written in Rust, which allows the CAP function 112 to be launched quickly (much quicker than CAP server 106 can be launched).

It should further be noted that in an example embodiment, CAP function 112 may contain a generic shell that is compatible with any number of different compiled CSN files 110. In this manner, a developer need not even have any understanding of how CAP server 106 functionality works, as that general functionality is built into the FaaS platform 104 (in Rust format). The developer need only supply the CDS model 108 itself, which is written at the domain level and is more about the interaction between data types than specific procedures being performed. To the extent specific procedures need to be defined by the developer, these may be supplied in the form of custom code 114 (also written in Rust), which can be incorporated by the FaaS platform 104 when launching the CAP function 112.

In another example embodiment, the CAP function 112, when launched, runs in WebAssembly language and the custom code 114 may be written in AssemblyScript, which is then compiled into WebAssembly language. WebAssembly is a binary instruction format for a stack-based virtual machine. It is designed as a portable complication target for programming languages, enabling deployment on the web for client and server application. This allows developers who are familiar with or have already written custom code in Javascript to utilize the custom code in the CAP function 112 without needing to compose code in Rust.

FaaS platform 104 provides a platform allowing users to develop, run, and manage application functionalities without the complexity of building and maintaining the infrastructure typically associated with developing and launching an application. It offers a "serverless" architecture, which is beneficial when building microservices applications. An example of a FaaS platform 104 is SAP Cloud Platform Functions from SAP SE of Walldorf, Germany.

FaaS provides for automatic dynamic horizontal scaling. More particularly, instances of the function can be launched only when needed and scaled up when demand is high. Each instance of the function is stateless.

It should be noted that is not mandatory that the application that is designed to work with the corresponding CAP function 112 in the FaaS platform 104 actually be or remain infrequently used during its lifecycle. If an infrequently used application changes into a frequently-used one, either permanently or temporarily, the provider of the FaaS platform can scale up the CAP function 112 to handle the demand. At a certain point, it becomes more cost-effective for the application to be implemented as a CAP server 164, and such a switch can be made at any point, but the decision as to whether to implement the application as a CAP function 112 in a FaaS platform and when to change that decision is completely in the hands of the application developer (or the entity controlling the application developer).

Figure 4:
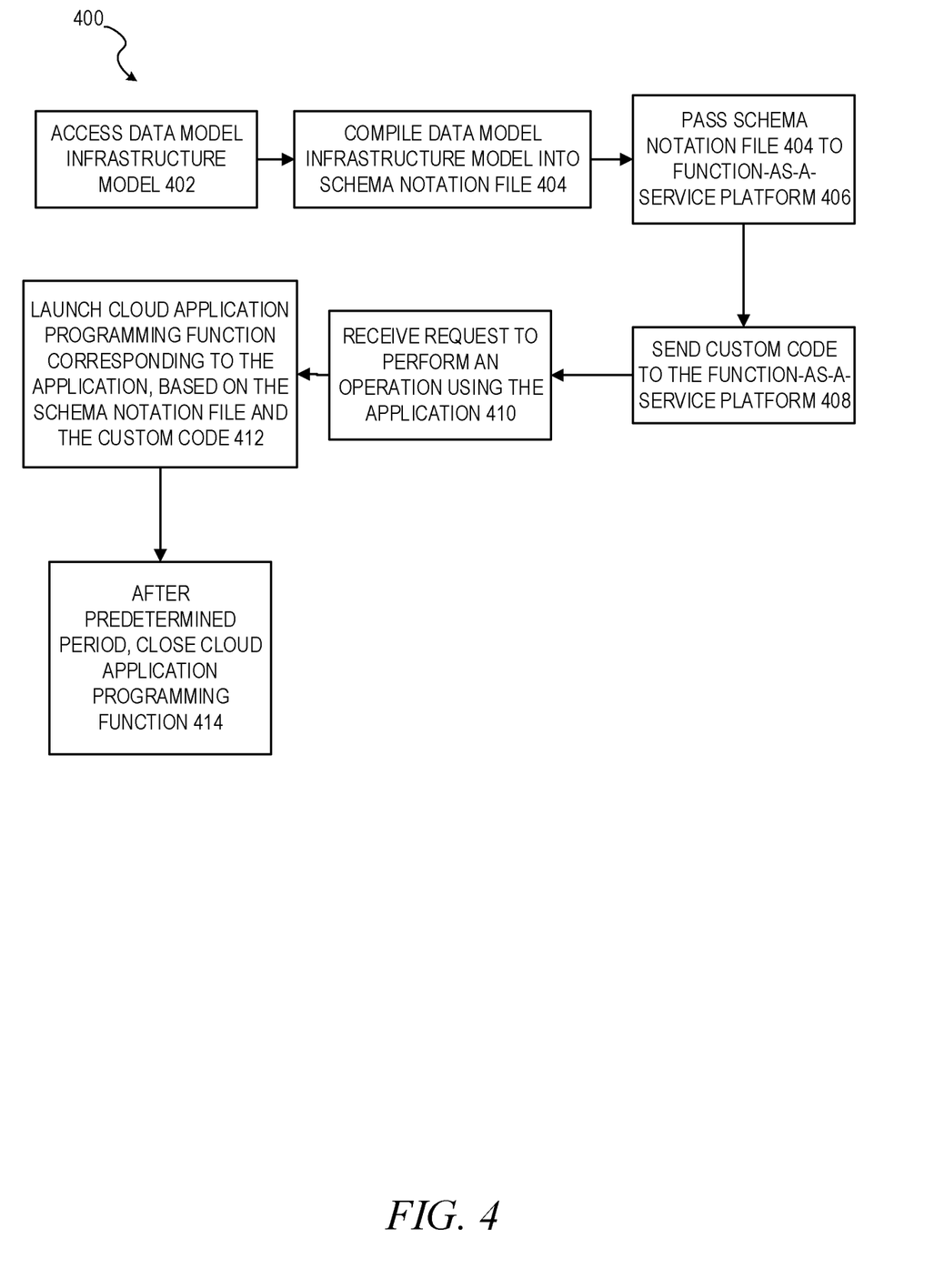
FIG. 4 is a flow diagram illustrating a method of deploying an application, in accordance with an example embodiment.

FIG. 4 is a flow diagram illustrating a method 400 of deploying an application, in accordance with an example embodiment. At operation 402, a data model infrastructure model is accessed. The data model infrastructure model declaratively defines one or more service definitions and data models of the application. In an example embodiment, the data model infrastructure model is a CDS model. At operation 404, the data model infrastructure model is compiled into a schema notation file. In an example embodiment, the schema notation file is a CSN file. At operation 406, the schema notation file is passed to a function-as-a-service (FaaS) platform. At operation 408, custom code is sent to the FaaS platform. At operation 410, a request to perform an operation using the application is received by the FaaS platform. In response, at operation 412, the FaaS platform launches a cloud application programming function corresponding to the application, based on the schema notation file and the custom code. This code defining the cloud application programming function and the custom code may be written in a system programming language, such as Rust or Go. After a predetermined period, at operation 414, the FaaS platform closes the cloud application programming function.

Figure 5:
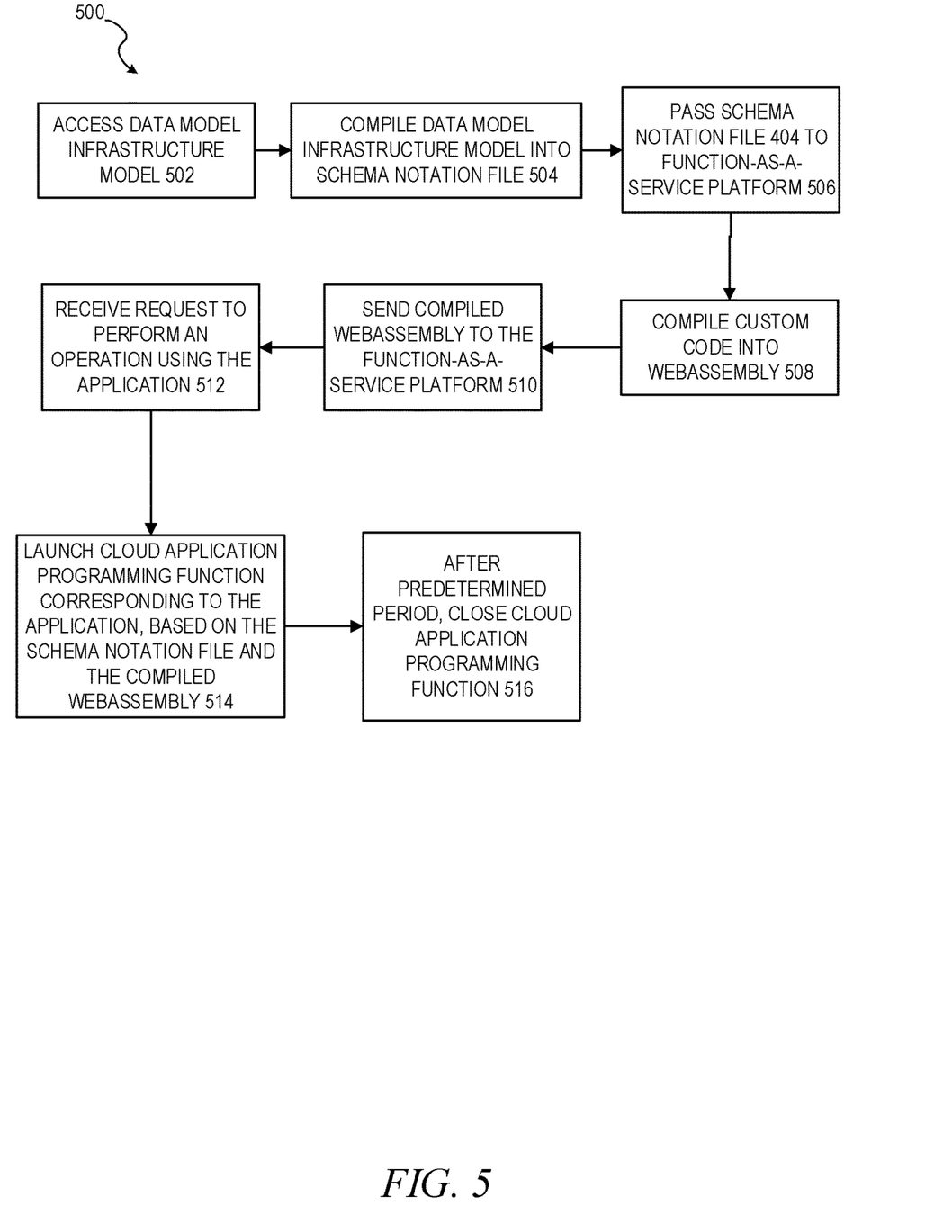
FIG. 5 is a flow diagram illustrating a method of deploying an application, in accordance with another example embodiment.

FIG. 5 is a flow diagram illustrating a method 500 of deploying an application, in accordance with another example embodiment. At operation 502, a data model infrastructure model is accessed. The data model infrastructure model declaratively defines one or more service definitions and data models of the application. In an example embodiment, the data model infrastructure model is a CDS model, although other implementations are possible. At operation 504, the data model infrastructure model is compiled into a schema notation file. In an example embodiment, the schema notation file is a CSN file. At operation 506, the schema notation file is passed to a function-as-a-service (FaaS) platform. At operation 508, custom code is compiled into WebAssembly. At operation 510, the compiled WebAssembly is sent to the FaaS platform. At operation 512, a request to perform an operation using the application is received by the FaaS platform. In response, at operation 514, the FaaS platform launches a cloud application programming function corresponding to the application, based on the schema notation file and the compiled WebAssembly. This code defining the cloud application programming function may have been originally may be written in a system programming language, such as Rust or Go, but has since been compiled into WebAssembly. After a predetermined period, at operation 516, the FaaS platform closes the cloud application programming function.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
accessing a data model infrastructure model declaratively defining one or more service definitions and data models of an application;
compiling the data model infrastructure model into a schema notation file; and
passing the schema notation file to a function-as-a-service (FaaS) platform, causing the FaaS platform to, based on the schema notation file, launch and run a cloud application programming function corresponding to the application in response to receiving a request to perform an operation using the application.

Example 2. The system of Example 1, wherein code defining the cloud application programming function is written in a system programming language.

Example 3. The system of Example 2, wherein the system programming language is Rust.

Example 4. The system of Example 2, wherein the system programming language is Go.

Example 5. The system of any of Examples 1-4, wherein the operations further comprise:
sending custom code to the FaaS platform, wherein the FaaS platform uses the custom code when launching and running the cloud application programming function corresponding to the application with the schema notation file.

Example 6. The system of any of Examples 1-5, wherein the cloud application programming function runs in WebAssembly.

Example 7. The system of Example 6, wherein the operations further comprise:
sending custom compiled code in WebAssembly format to the FaaS platform, wherein the FaaS platform uses the compiled custom code when launching and running the cloud application programming function corresponding to the application with the schema notation file.

Example 8. The system of Example 7, wherein the scripting language is JavaScript.

Example 9. A method comprising:

accessing a data model infrastructure model declaratively defining one or more service definitions and data models of an application;

compiling the data model infrastructure model into a schema notation file; and passing the schema notation file to a function-as-a-service (FaaS) platform, causing the FaaS platform to, based on the schema notation file, launch and run a cloud application programming function corresponding to the application in response to receiving a request to perform an operation using the application.

Example 10. The method of Example 9, wherein code defining the cloud application programming function is written in a system programming language.

Example 11. The method of Example 10, wherein the system programming language is Rust.

Example 12. The method of Example 10, wherein the system programming language is Go.

Example 13. The method of any of Examples 9-12, further comprising:

sending custom code to the FaaS platform, wherein the FaaS platform uses the custom code when launching and running the cloud application programming function corresponding to the application with the schema notation file.

Example 14. The method of any of Examples 9-13, wherein the cloud application programming function runs in WebAssembly.

Example 15. The method of Example 14, wherein the operations further comprise:

sending custom compiled code in WebAssembly format to the FaaS platform, wherein the FaaS platform uses the compiled custom code when launching and running the cloud application programming function corresponding to the application with the schema notation file.

Example 16. The method of Example 15, wherein the scripting language is JavaScript.

Example 17. A non-transitory machine-readable medium storing instructions which, when executed by one or more processors, cause the one or more processors to perform operations comprising:

accessing a data model infrastructure model declaratively defining one or more service definitions and data models of an application;

compiling the data model infrastructure model into a schema notation file; and passing the schema notation file to a function-as-a-service (FaaS) platform, causing the FaaS platform to, based on the schema notation file, launch and run a cloud application programming function corresponding to the application in response to receiving a request to perform an operation using the application.

Example 18. The non-transitory machine-readable medium of Example 17, wherein code defining the cloud application programming function is written in a system programming language.

Example 19. The non-transitory machine-readable medium of Example 18, wherein the system programming language is Rust.

Example 20. The non-transitory machine-readable medium of Example 18, wherein the system programming language is Go.

Figure 6:
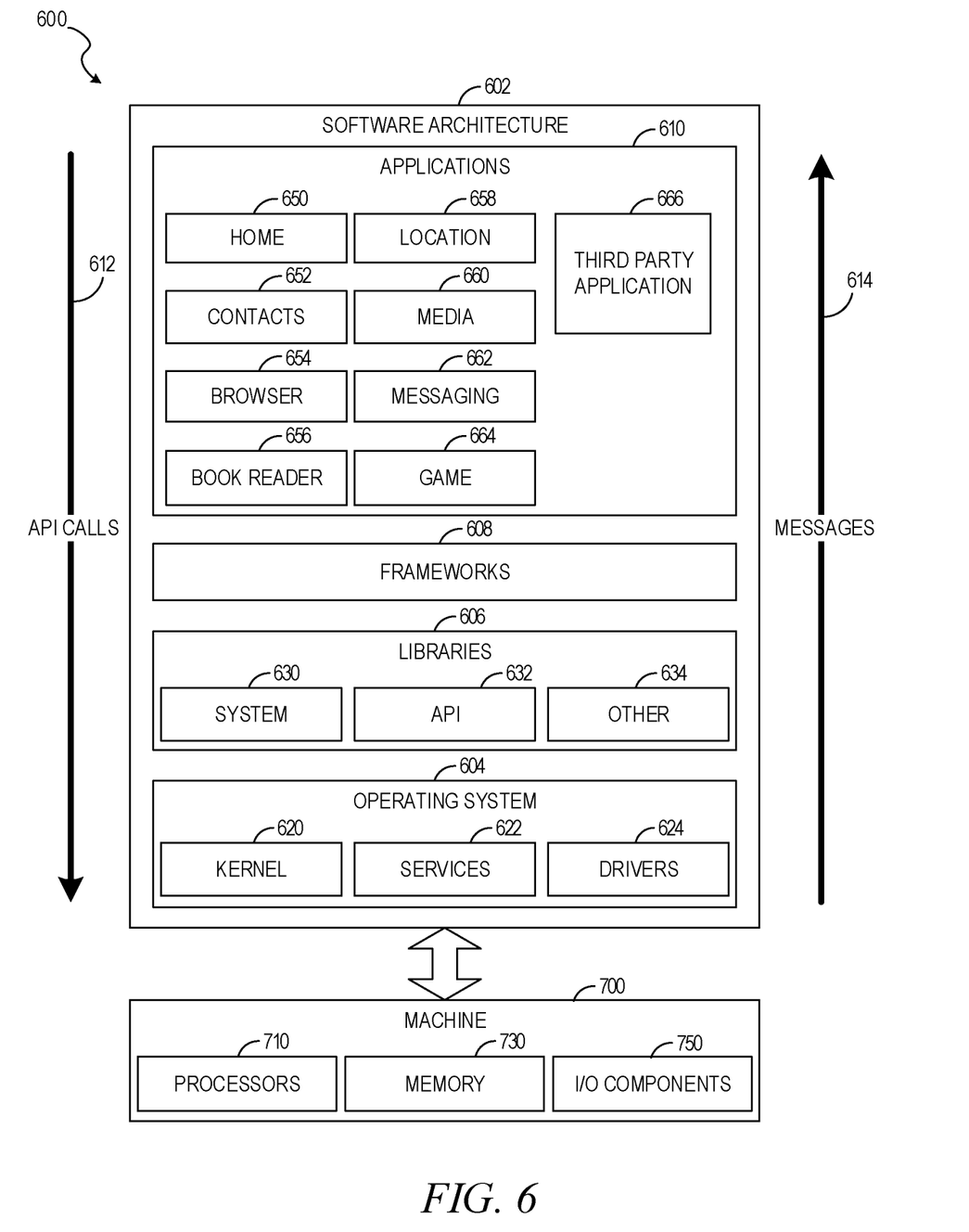
FIG. 6 is a block diagram illustrating an example architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 666 can invoke the API calls 612 provided by the operating system 604 to facilitate functionality described herein.

Figure 7:
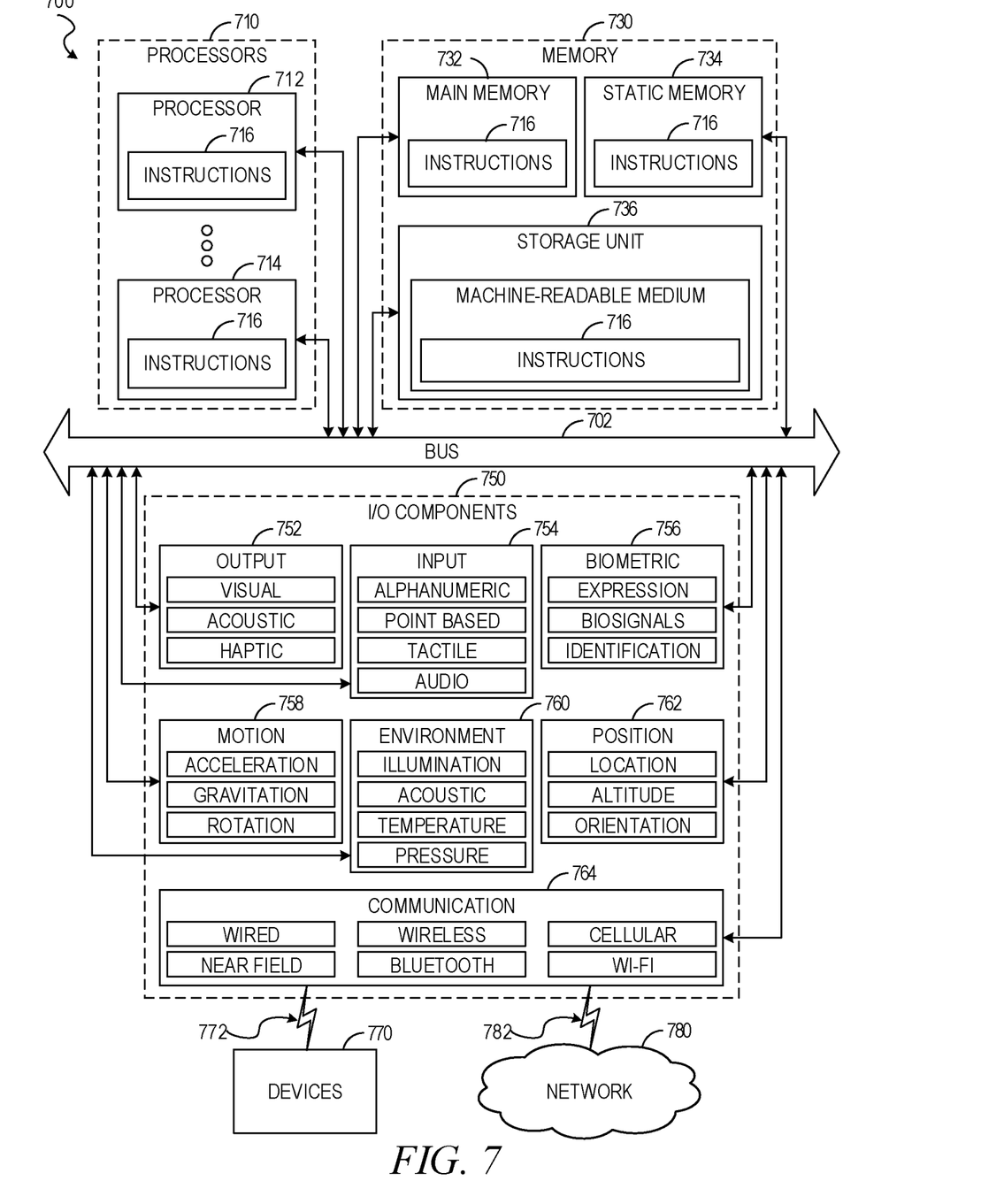
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing a data model infrastructure model declaratively defining one or more service definitions and data models of an application;
   compiling the data model infrastructure model into a schema notation file; and
   passing the schema notation file to a function-as-a-service (FaaS) platform, causing the FaaS platform to, based on the schema notation file, launch and run a cloud application programming function corresponding to the application in response to receiving a request to perform an operation using the application.

2. The system of claim 1, wherein code defining the cloud application programming function is written in a system programming language.

3. The system of claim 2, wherein the system programming language is Rust.

4. The system of claim 2, wherein the system programming language is Go.

5. The system of claim 1, wherein the operations further comprise:
   sending custom code to the FaaS platform, wherein the FaaS platform uses the custom code when launching and running the cloud application programming function corresponding to the application with the schema notation file.

6. The system of claim 1, wherein the cloud application programming function runs in WebAssembly.

7. The system of claim 6, wherein the operations further comprise:
   sending custom compiled code in WebAssembly format to the FaaS platform, wherein the FaaS platform uses the compiled custom code when launching and running the cloud application programming function corresponding to the application with the schema notation file.

8. The system of claim 7, wherein the scripting language is JavaScript.

9. A method comprising:
   accessing a data model infrastructure model declaratively defining one or more service definitions and data models of an application;
   compiling the data model infrastructure model into a schema notation file; and
   passing the schema notation file to a function-as-a-service (FaaS) platform, causing the FaaS platform to, based on the schema notation file, launch and run a cloud application programming function corresponding to the application in response to receiving a request to perform an operation using the application.

10. The method of claim 9, wherein code defining the cloud application programming function is written in a system programming language.

11. The method of claim 10, wherein the system programming language is Rust.

12. The method of claim 10, wherein the system programming language is Go.

13. The method of claim 9, further comprising:
    sending custom code to the FaaS platform, wherein the FaaS platform uses the custom code when launching and running the cloud application programming function corresponding to the application with the schema notation file.

14. The method of claim 9, wherein the cloud application programming function runs in WebAssembly.

15. The method of claim 14, wherein the operations further comprise:
    sending custom compiled code in WebAssembly format to the FaaS platform, wherein the FaaS platform uses the compiled custom code when launching and running the cloud application programming function corresponding to the application with the schema notation file.

16. The method of claim 15, wherein the scripting language is JavaScript.

17. A non-transitory machine-readable medium storing instructions which, when executed by one or more processors, cause the one or more processors to perform operations comprising:
    accessing a data model infrastructure model declaratively defining one or more service definitions and data models of an application;
    compiling the data model infrastructure model into a schema notation file; and
    passing the schema notation file to a function-as-a-service (FaaS) platform, causing the FaaS platform to, based on the schema notation file, launch and run a cloud application programming function corresponding to the application in response to receiving a request to perform an operation using the application.

18. The non-transitory machine-readable medium of claim 17, wherein code defining the cloud application programming function is written in a system programming language.

19. The non-transitory machine-readable medium of claim 18, wherein the system programming language is Rust.

20. The non-transitory machine-readable medium of claim 18, wherein the system programming language is Go.

* * * * *